United States Patent
Pittman (10) Patent No.: US 9,328,581 B2
(45) Date of Patent: May 3, 2016

(54) THRU-TUBING MILL

(71) Applicant: Frank Clarence Pittman, Leduc County (CA)

(72) Inventor: Frank Clarence Pittman, Leduc County (CA)

(73) Assignee: Frank Clarence Pittman

( * ) Notice: Subject to any disclaimer, the term of this patent is extended or adjusted under 35 U.S.C. 154(b) by 393 days.

(21) Appl. No.: 13/774,714

(22) Filed: Feb. 22, 2013

(65) Prior Publication Data

US 2013/0213719 A1 Aug. 22, 2013

Related U.S. Application Data

(60) Provisional application No. 61/601,558, filed on Feb. 22, 2012.

(51) Int. Cl.
*E21B 29/00* (2006.01)
*B23P 15/34* (2006.01)

(52) U.S. Cl.
CPC *E21B 29/00* (2013.01); *B23P 15/34* (2013.01)

(58) Field of Classification Search
CPC ... E21B 29/002; E21B 29/005; E21B 29/007; E21B 29/00
See application file for complete search history.

(56) References Cited

U.S. PATENT DOCUMENTS

| 5,887,668 | A * | 3/1999 | Haugen et al. | 175/79 |
| 7,096,982 | B2 | 8/2006 | McKay et al. | |
| 2007/0221406 | A1 * | 9/2007 | Hall | E21B 10/43 175/40 |
| 2009/0301788 | A1 * | 12/2009 | Stevens et al. | 175/374 |

OTHER PUBLICATIONS

Diane Langley, Drilling Contractor, 2011 SPE/IADC Drilling Conference: Conference theme is 'Being the best—growing our business' Posted on Jan. 28, 2011.
Steve Rosenburg and Doug Reid, Weatherford International Ltd., Drillable bit is key to successful DwC operations, Feb. 15, 2007.

* cited by examiner

*Primary Examiner* — Brad Harcourt (57) ABSTRACT

A thru-tubing mill with an elongate body having an attachment end and a milling end. The attachment end is attached to a tubing string. The milling end has a semi-torroidal surface defined by a two-dimensional curved line rotated about a central point that is spaced from the curve in a direction that is perpendicular to the curved line and a plurality of curved support members attached to the semi-torroidal surface that extend along the semi-torroidal surface, each curved support members having a first curve similar to the two-dimensional curved line in a first dimension and a second curve that is cambered relative to the two-dimensional curved line in a second dimension. A hard coating is installed on at least one side of the curved support members.

18 Claims, 7 Drawing Sheets

THRU-TUBING MILL

FIELD

This relates to a mill that is primarily designed to be used in tubing, such as to drill out obstructions in a tubing string.

BACKGROUND

In some tubing strings, it may be necessary to drill out certain obstructions. For example, a selective fracing tool such as a tool described in U.S. Pat. No. 7,431,091 (Themig et al.) entitled "Method and apparatus for wellbore fluid treatment" uses different sizes of balls to selectively close sections of the tubing string to apply fracing pressure to a desired section of a formation. The balls and preferably some or all of the ball seats must then be removed in order to allow fluid to flow freely once the facing operation has been completed. Other tubing strings may have other components for similar or different operations, may be filled with cement that must be removed, or may become filled with debris such that a cleanout operation is required. These various operations are generally performed by a thru-tubing mill.

SUMMARY

According to an aspect, there is provided a thru-tubing mill, comprising an elongate body having an attachment end and a milling end, the attachment end being attached to a tubing string. The milling end comprises a semi-torroidal surface defined by a two-dimensional curved line rotated about a central point that is spaced from the curve in a direction that is perpendicular to the curved line. A plurality of curved support members are attached to the semi-torroidal surface that extend along the semi-torroidal surface. Each curved support members has a first curve similar to the two-dimensional curved line in a first dimension and a second curve that is cambered relative to the two-dimensional curved line in a second dimension. A hard coating is installed on at least one side of the curved support members.

According to another aspect, the thru-tubing mill may further comprise angled flow channels extending along an outer surface of the elongate body from the semi-torroidal surface toward the attachment end.

According to another aspect, the elongate body may comprise a central flow channel and the semi-torroidal surface comprises flow ports in communication with the central flow channel.

According to another aspect, the hard coating may comprise carbide pieces mounted to at least the curved support members.

According to another aspect, the hard coating may comprise carbide pieces mounted to the at least one side of the curved support members and to the semi-torroidal surface.

According to another aspect, there is provided a method of manufacturing a thru-tubing mill, comprising the steps of: providing a semi-torroidal surface at a milling end of a tubular body, the semi-torroidal surface being defined by a curved line rotated about a central point that is spaced from the curve in a direction that is perpendicular to the curved line; attaching a plurality of curved support members to the semi-torroidal surface, each curved support members having a first curve similar to the two-dimensional curved line in a first dimension and a second curve that is cambered relative to the two-dimensional curved line in a second dimension; and hard coating at least one side of the curved support members.

According to another aspect, the method may further comprise the step of providing angled flow channels along an outer surface of the elongate body from the semi-torroidal surface toward the attachment end.

According to another aspect, the elongate body may comprise a central flow channel and the semi-torroidal surface comprises flow ports in communication with the central flow channel.

According to another aspect, hard coating may comprise mounting carbide pieces to the at least one side of the curved support members.

According to another aspect, hard coating may comprise mounting carbide pieces to the at least one side of the curved support members and to the semi-torroidal surface.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 16:
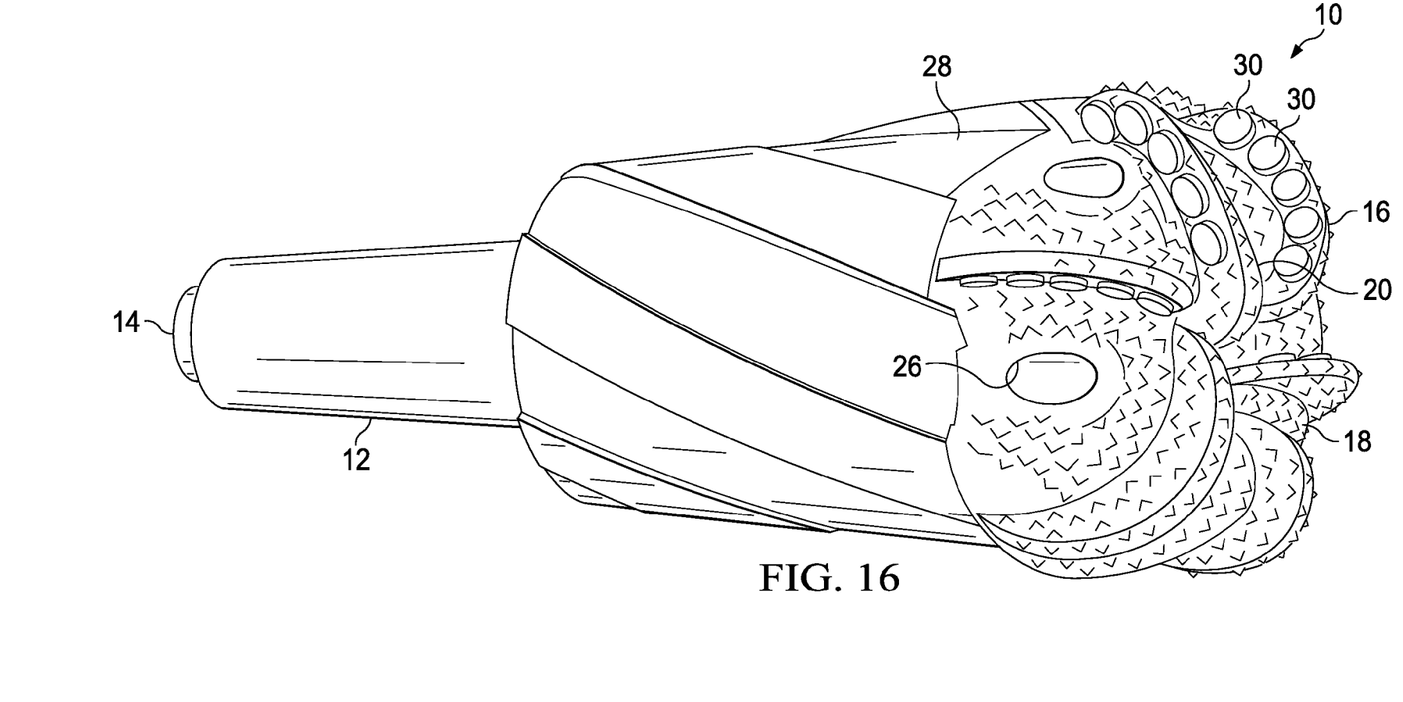

Referring to FIG. 16, a thru-tubing mill 10 is shown. As can be seen, mill 10 is made up of an elongate body 12 having an attachment end 14 and a milling end 16. Attachment end 14 is designed to be attached to a tubing string, such that a rotary force may be applied to milling end 16.

Figures 5, 6, 7:
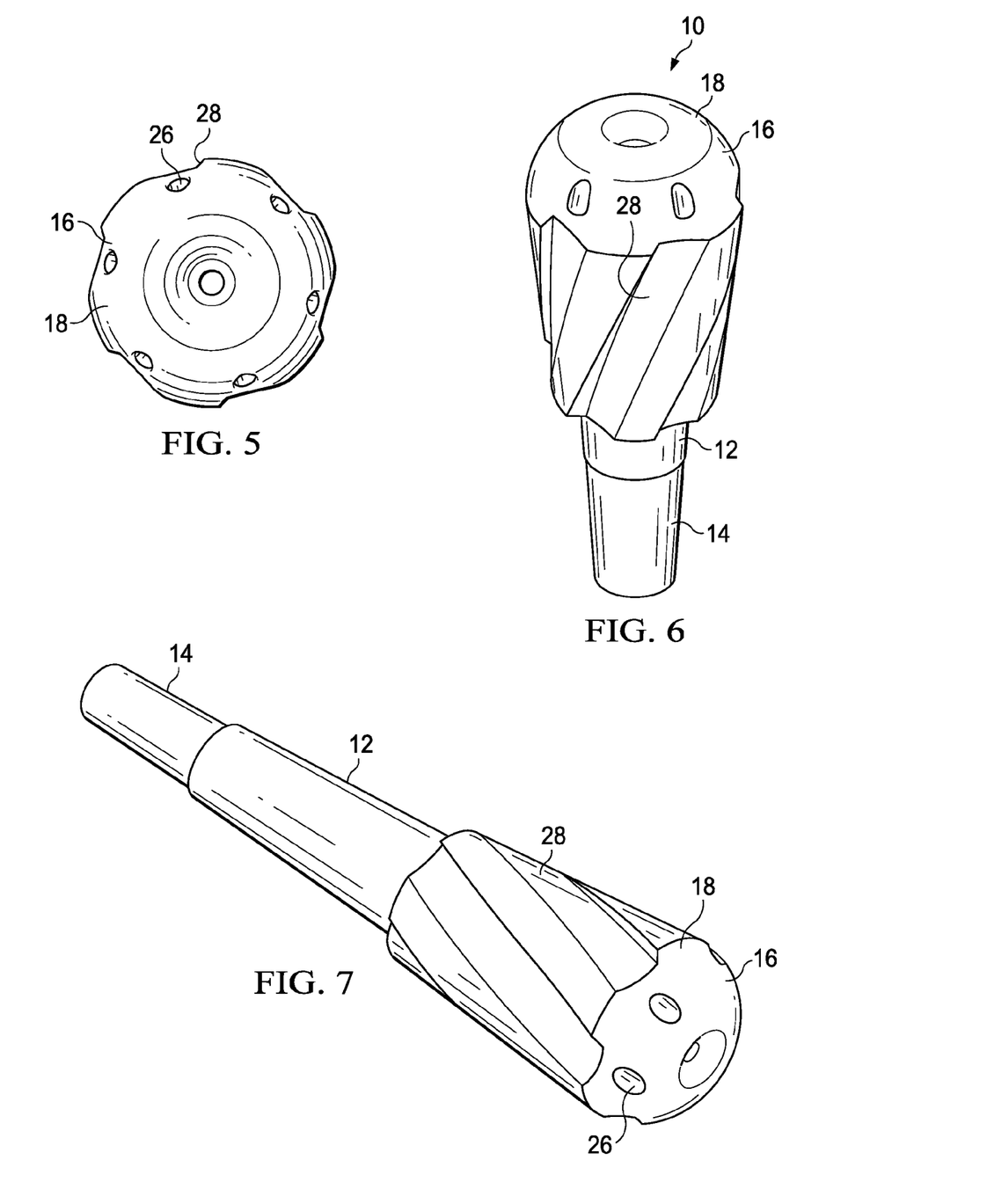
FIG. 5-7 are illustrations of a machined end of a thru-tubing mill prior to installation of the cutting components.

Referring to FIG. 5-7, milling end 16 comprises a semi-torroidal surface 18 along its radius. Semi-torroidal surface 18 may be described as being defined by a two-dimensional curved line that is rotated about a central point, or the axis of elongate body 12, where the curve is spaced outward from that central point or axis. Generally speaking, the two-dimensional curved line is preferably a parabola, with the apex of the parabola defining the most extended portion of the semi-torroidal surface. It will be understood that the geometric terms used herein are not to be strictly interpreted and are intended to include minor variations and approximations to the geometric definitions. For example, an approximation may include straight segments rather than a continuous curve that may be desired for manufacturing purposes or otherwise, or the curve may have a section with a different radius of curvature that cannot be defined properly by a parabola. These variations and approximations may still result in the same effect or acceptable changes to the effect when the tool is used in practice, and therefore the geometric terms are merely used to help define the general class of shape used for the end surface.

In another description, milling end 16 may be described as having a recessed central portion, a recesses outer portion and a central portion that is intermediate the central portion and the outer portion extends outward relative to the central portion and the recessed outer portion. Alternatively, milling end 16 may be describe as defining a convex surface that is modified to be recessed toward a central point on the convex surface.

Figure 1:
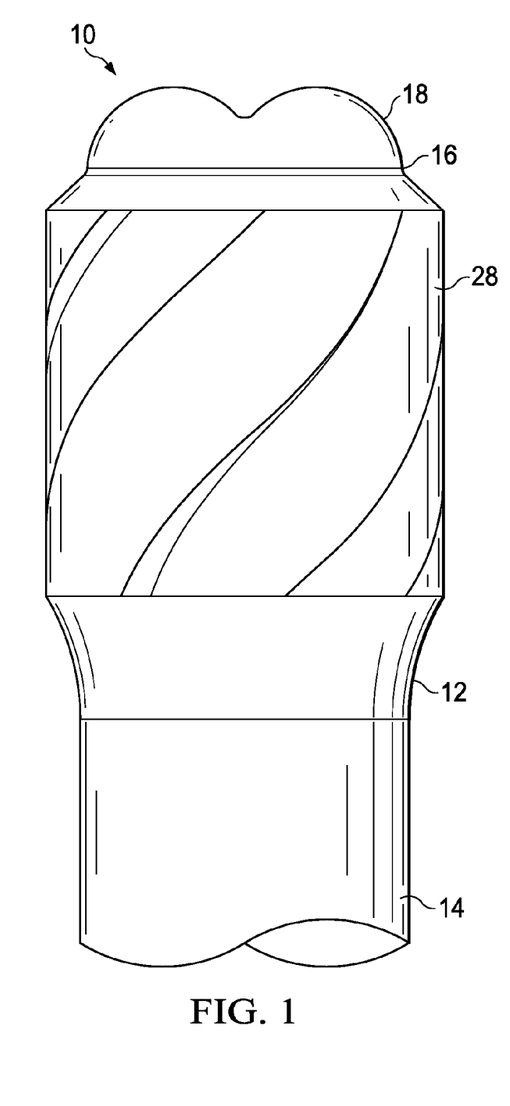
FIG. 1 is a side elevation view of the milling head without curved support members or hard coating.
Figure 2:
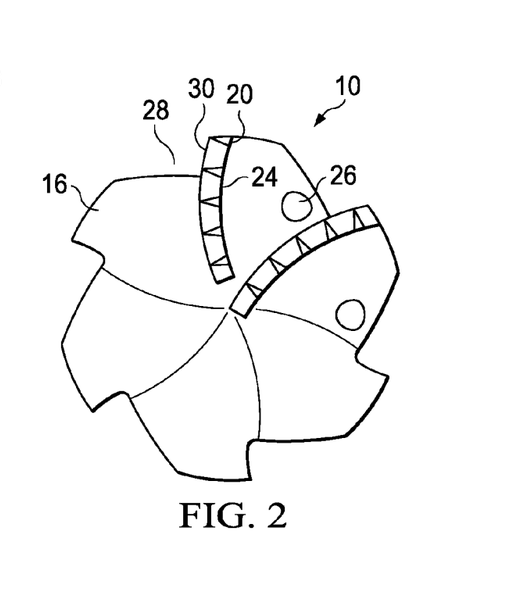
FIG. 2 is an end elevation view of the cutting head of a partially completed thru-tubing mill.
Figure 3:
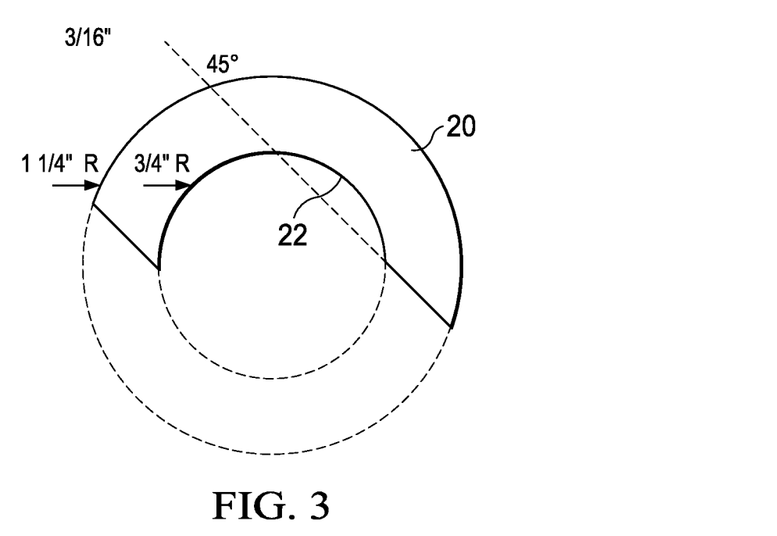
FIG. 3 is a side elevation view of a component that may be used on the cutting head of the thru-tubing mill.
Figure 4:
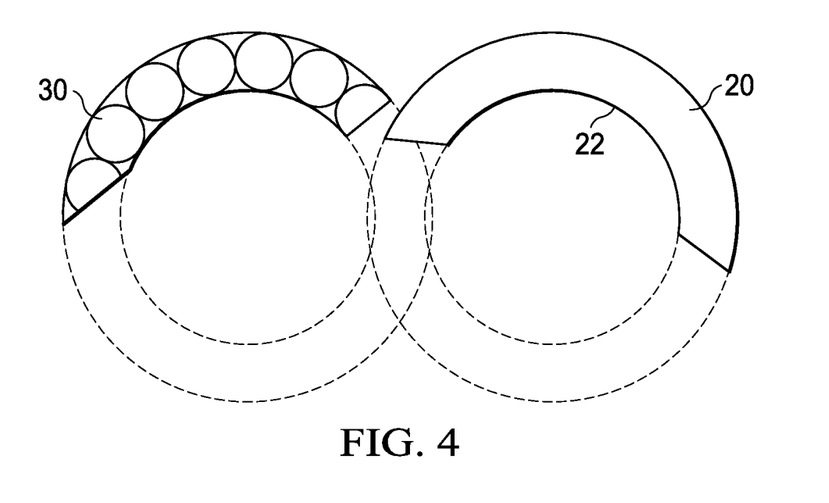
FIG. 4 is a side elevation view of components that may be used on the cutting head of the thru-tubing mill.
Figure 8:
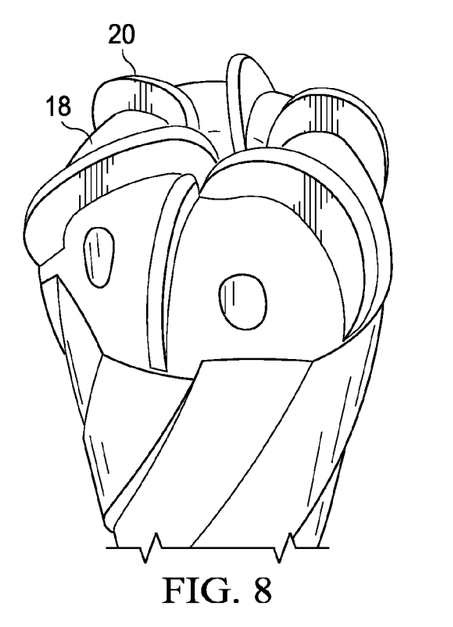
FIG. 8-10 are illustrations of the machined end with curved projections attached.
Figure 9:
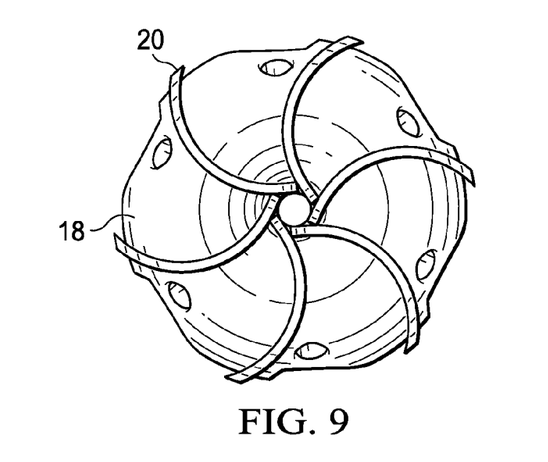
Figure 10:
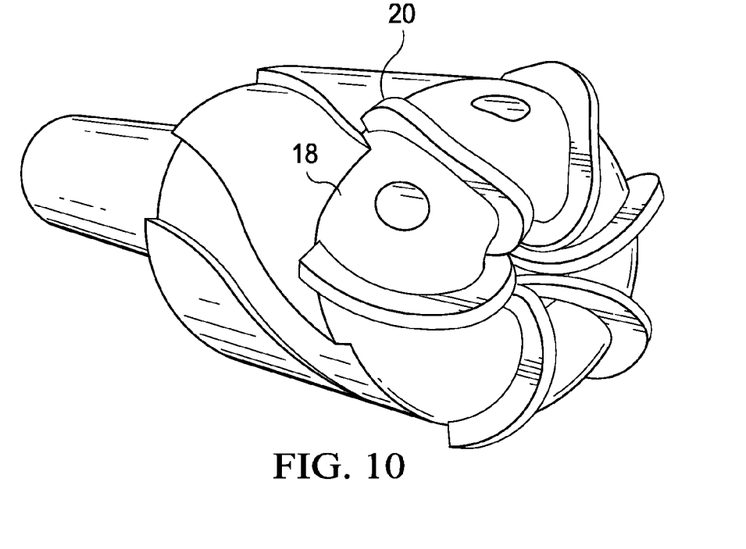
Figure 11:
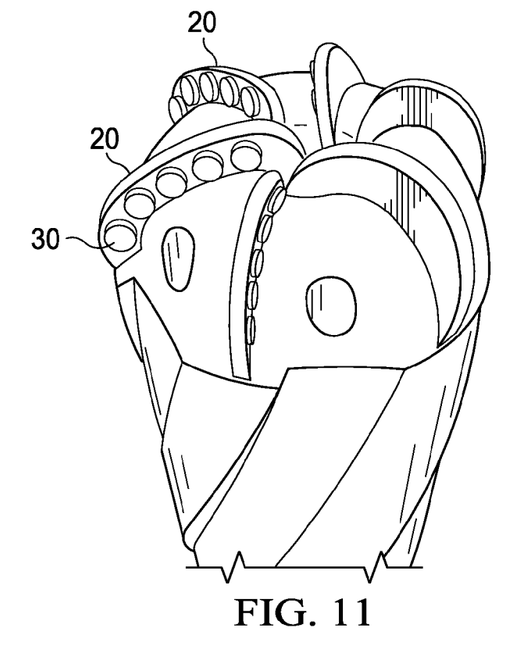
FIGS. 11 and 12 are illustrations of the end of the thru-tubing mill with carbide pieces attached to the curved projections.
Figure 12:
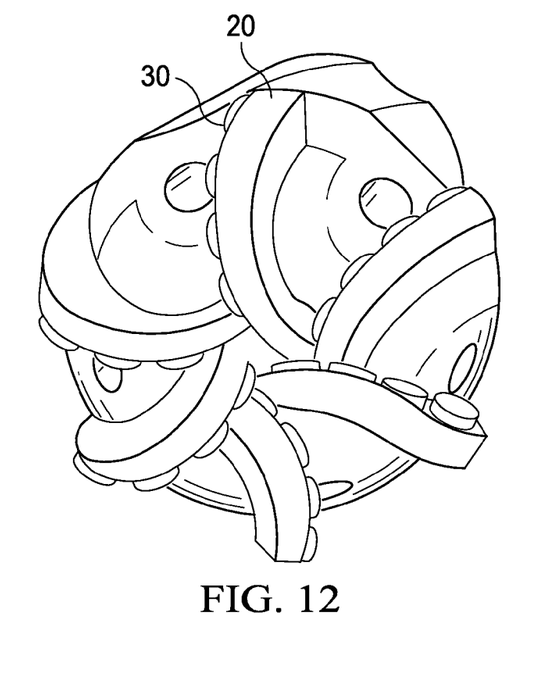
Figure 13:
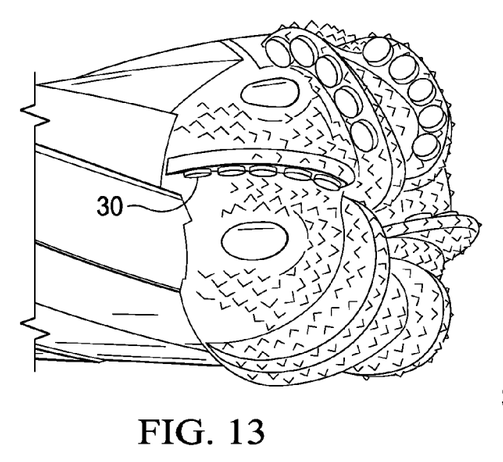
FIG. 13-16 are illustrations of the thru-tubing mill with carbide pieces installed.
Figure 14:
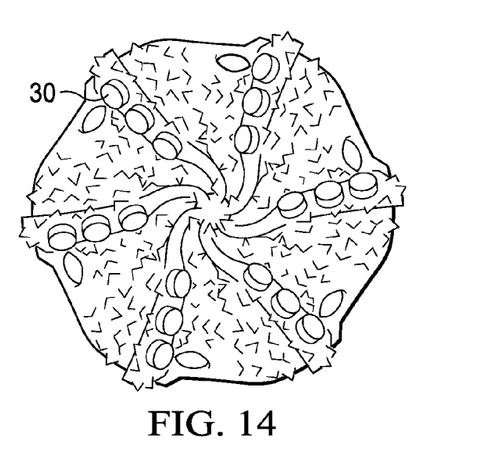
Figure 15:
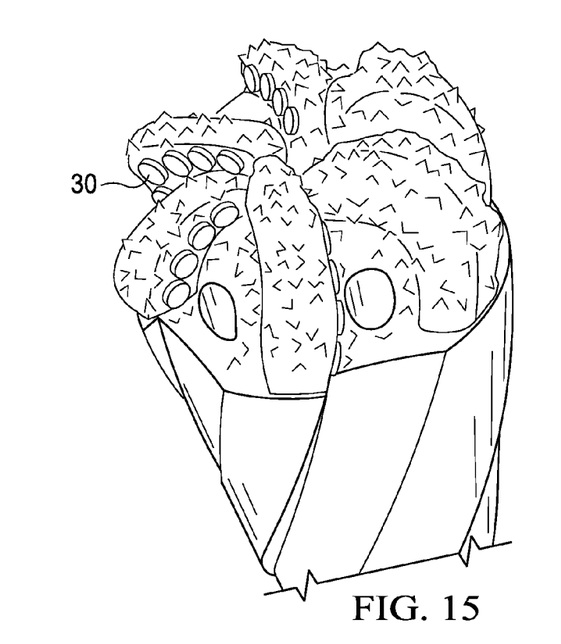

Referring to FIG. 8-10, a plurality of curved support members 20 are attached to semi-torroidal surface 18. As can be seen, support members 18 extend and are curved along the semi-torroidal surface 18. Referring to FIG. 2 through 4, looking from the side, each curved support member 20 has a first curve 22 that matches or is similar to the two-dimensional curved line used to define the semi-torroidal surface 18 in a first dimension. The curve may not be exactly the same as the two-dimensional curved line in all circumstances, but should be a close enough approximation that they can be effectively attached to surface 18. Preferably, curved support members 20 are welded onto surface 18. If desired, surface 18 may be altered to assist in or improve the strength of the attachment. Referring to FIG. 2 as well as FIG. 5-7, each curved support member 20 also has a second curve 24 when looking at an end view of milling end 16. As can be seen, curved support members 20 are cambered relative to the two-dimensional curved line. In other words, curved support members 20 may be considered curved and twisted, such that they lie along, and are curved about semi-torroidal surface 18 to form what may be considered a shape and pattern that is related to a turbine.

In one embodiment, curved support members 20 may be made from appropriately sized washers that are cut to the right size and bent appropriately. As can be seen in FIG. 8, surface 18 has a smaller radius than the outer surface of elongate body 12. The difference in the radius is designed to accommodate the thickness of curved support members 20, such that, when they are installed and hard coated, the outer radius substantially matches the outer surface of elongate body 12. This is done for convenience and effectiveness in the intended uses of thru-tubing mill 10, and will be the primary design. However, it would also be possible to have the completed radius of milling end 16 to be greater or smaller than the outer radius of elongate body 12, such as if there were other cutting components immediately behind milling end 16.

Referring to FIG. 11-16, once support members 20 have been attached, milling end 16 is hard coated. Preferably, this will be done by attaching pieces of carbide 30 using known techniques. In the depicted embodiment, carbide "buttons", or regularly sized pieces of carbide, have been attached directly to one side of support members 20 in the direction of rotation of milling end 16, i.e. the convex surface, and irregular pieces of carbide have been attached to surface 18 immediately adjacent to support members 20. As shown, the irregular pieces of carbide are attached adjacent to sheltered side of support members 20, i.e. the concave surface, and extend out past the top of the carbide buttons. The carbide buttons are used primarily to protect support members 20 from damage and wear, while the irregular pieces are used for the actual milling.

As can be seen, milling end 16 has ports 26 spaced about milling end 16. In the depicted embodiment, ports 26 are evenly spaced about the circumference of milling end 16 between support members 20. There may also be a port in the center of milling end 16 (not shown). Ports 26 are in communication with a flow channel that passes through elongate body 12 (not shown) to deliver fluid to milling end 16. The fluid is used to cool milling end 16 as well as flush away cuttings. As support members 20 are curved, they help carry fluid and cuttings away from milling end 16. As can be seen, particularly in FIG. 16, elongate body 12 also has angled flow channels 28 that extend along an outer surface of elongate body 12 starting at surface 20. Angled flow channels 28 and support members 20 are curved in the direction of rotation of milling end 16 to help move fluid and cuttings away from milling end 16. An appropriate movement of cuttings and fluid helps prevent the hard coating from becoming filled with the material being milled, which would reduce its effectiveness. In addition, this direction of curvature helps bite or screw into what is being drilled, or in other words, allow for a more aggressive milling operation. This may be important, particularly in situations where little or no weight is placed on milling end 16.

Thru-tubing mills are often used to drill out components used in selective fracing tools, such as the ball and the seat that it closes. As the milling end 16 is slightly curved in the middle, this helps "capture" the ball and allow it to be milled out. After the ball has been milled, the seat must be removed. The curve on the outside of milling end 16 helps to center it within the ball seat, making it effective at removing the seat. Generally speaking, milling end 16 will be slightly smaller than the tubing in which seat is located, such that a portion of the seal will remain. The portion of the seal that remains is preferably the "slips", which is often a hard metal component that secures the softer seat portion to the tubing. As the slips are generally hard, it is preferable to not try and mill those out. A common size of a thru-tubing mill for drilling out selective fracing tools is about 3¾" to 3⅞", although other sizes may be used, such as between 3½" to 4¾".

Preferably, the radius of curvature of second curve 24 of support members 20, and therefore the line that defines the semi-torroidal shape, is about the same as the radius of curvature of milling end 16. This helps ensure an appropriate curvature to maintain the advantages described above.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. The scope of the claims should not be limited by the preferred embodiments set forth in the examples, but should be given the broadest interpretation consistent with the description as a whole.

What is claimed is:

1. A thru-tubing mill comprising:
an elongate body having an attachment end and a milling end, the attachment end being attached to a tubing string, the milling end comprising:
a semi-torroidal surface defined by a two-dimensional curved line spaced outward from an axis of the elongate body and rotated about the axis of the elongate body;
a plurality of curved support members attached to the semi-torroidal surface that extend along the semi-torroidal surface, each curved support members having a first curve similar to the two-dimensional curved line in a first dimension and a second curve that is cambered relative to the two-dimensional curved line in a second dimension; and a hard coating installed on at least one side of the curved support members.

2. The thru-tubing mill of claim 1, further comprising angled flow channels extending along an outer surface of the elongate body from the semi-torroidal surface toward the attachment end.

3. The thru-tubing mill of claim 1, wherein the elongate body comprises a central flow channel and the semi-torroidal surface comprises flow ports in communication with the central flow channel.

4. The thru-tubing mill of claim 1, wherein the hard coating comprises carbide pieces mounted to at least the curved support members.

5. The thru-tubing mill of claim 1, wherein the hard coating comprises carbide pieces mounted to the at least one side of the curved support members and to the semi-torroidal surface.

6. A method of manufacturing a thru-tubing mill, comprising:

providing a semi-torroidal surface at a milling end of a tubular body, the semi-torroidal surface being defined by a curved line rotated about a central point that is spaced from the curve in a direction that is perpendicular to the curved line;

attaching a plurality of curved support members to the semi-torroidal surface, each curved support members having a first curve similar to the curved line defining the semi-torroidal surface in a first dimension and a second curve that is cambered relative to the curved line defining the semi-torroidal surface in a second dimension; and hard coating at least one side of the curved support members.

7. The method of claim 6, further comprising the step of providing angled flow channels along an outer surface of the tubular body from the semi-torroidal surface toward an attachment end of the tubular body.

8. The method of claim 6, wherein the tubular body comprises a central flow channel and the semi-torroidal surface comprises flow ports in communication with the central flow channel.

9. The method of claim 6, wherein hard coating comprises mounting carbide pieces to the at least one side of the curved support members.

10. The method of claim 6, wherein hard coating comprises mounting carbide pieces to the at least one side of the curved support members and to the semi-torroidal surface.

11. A thru-tubing mill, comprising:

a convex surface recessed toward a central axis;

a plurality of support members, each of the plurality of support members comprising a first curve attached to the convex surface and a second curve that is cambered relative to the first curve; and a hard coating installed on at least one side of each of the plurality of support Members;

wherein the convex surface is a semi-torroidal surface defined by a curved line spaced outward from the central axis and rotated about the central axis.

12. The thru-tubing mill of claim 11, further comprising an attachment end configured to be attached to a tubing string.

13. The thru-tubing mill of claim 11, further comprising:

an attachment end; and a tubing string attached to the attachment end.

14. The thru-tubing mill of claim 11, wherein the second curve is cambered in a direction of rotation of the thru-tubing mill.

15. A thru-tubing mill, comprising:

a convex surface recessed toward a central axis;

a plurality of support members, each of the plurality of support members comprising a first curve attached to the convex surface and a second curve that is cambered relative to the first curve; and a hard coating installed on at least one side of each of the plurality of support members;

wherein the convex surface is a semi-torroidal surface defined by a parabolic line spaced outward from the central axis and rotated about the central axis.

16. The thru-tubing mill of claim 15, further comprising an attachment end configured to be attached to a tubing string.

17. The thru-tubing mill of claim 15, further comprising:

an attachment end; and a tubing string attached to the attachment end.

18. The thru-tubing mill of claim 15, wherein the second curve is cambered in a direction of rotation of the thru-tubing mill.

* * * * *